(12) United States Patent
Ihalainen et al.

(10) Patent No.: US 11,283,502 B2
(45) Date of Patent: Mar. 22, 2022

(54) POSITION LIKELIHOOD BASED BEAMFORMER OPTIMIZATION

(71) Applicant: Nokia Solutions and Networks Oy, Espoo (FI)

(72) Inventors: Tero Johannes Ihalainen, Nokia (FI); Toni Levanen, Tampere (FI); Jukka Olavi Talvitie, Tampere (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/284,652

(22) PCT Filed: Oct. 17, 2018

(86) PCT No.: PCT/EP2018/078438
§ 371 (c)(1),
(2) Date: Apr. 12, 2021

(87) PCT Pub. No.: WO2020/078547
PCT Pub. Date: Apr. 23, 2020

(65) Prior Publication Data
US 2021/0399777 A1    Dec. 23, 2021

(51) Int. Cl.
*H04B 7/06*    (2006.01)
(52) U.S. Cl.
CPC .................. *H04B 7/0617* (2013.01)
(58) Field of Classification Search
CPC .................................................. H04B 7/0617
USPC ......................................................... 375/267
See application file for complete search history.

(56) References Cited

U.S. PATENT DOCUMENTS

| 9,832,754 | B1 | 11/2017 | Akkarakaran et al. |
| 2017/0310377 | A1* | 10/2017 | Kang ................... H04B 7/0417 |
| 2018/0331738 | A1* | 11/2018 | Agrawal ............... H04B 7/0802 |

FOREIGN PATENT DOCUMENTS

CN    103260240 A    8/2013

OTHER PUBLICATIONS

Tatino, Cristian, et al., "Beam Based Stochastic Model of the Coverage Probability in 5G Millimeter Wave Systems", © 2017, IFIP, 6 pgs.

* cited by examiner

*Primary Examiner* — Fitwi Y Hailegiorgis
(74) *Attorney, Agent, or Firm* — Harrington & Smith

(57) ABSTRACT

According to an aspect, there is provided a beamforming processing apparatus for a radio transmitter or receiver including an antenna array. The beamforming processing apparatus includes circuitry configured for maintaining, in a database, information on radiation properties of the antenna array and probability density functions for target device positions. The radiation properties of the antenna array include beam parameters and a beam parameter dependent beam gain function. The beamforming processing apparatus includes circuitry configured for calculating cumulative distribution functions of beam gain based on the probability density functions and the beam gain function and based thereon one or more optimal values of beam parameters defining an optimal beam by maximizing a first optimization parameter defined based on the one or more cumulative distribution functions subject to a minimum value of a second optimization parameter.

18 Claims, 10 Drawing Sheets

POSITION LIKELIHOOD BASED BEAMFORMER OPTIMIZATION

CROSS REFERENCE TO RELATED APPLICATION

This patent application is a U.S. National Stage application of International Patent Application Number PCT/EP2018/078438 filed Oct. 17, 2018, which is hereby incorporated by reference in its entirety.

TECHNICAL FIELD

Various example embodiments relates to wireless communications.

BACKGROUND

Using millimeter wave carrier frequencies holds a great potential to fulfil the very high data rate requirements envisioned in a number of 5G New Radio (NR) use cases and their diverse field of applications, due to possibility to exploit large spectral channels available on those frequencies. In millimeter wave communications, it is possible to employ antenna arrays comprising a large number of antenna elements at both the transmitter (TX) and receiver (RX) end of the communication link. Large antenna arrays are able to provide high antenna gains needed to compensate for the increased pathloss when using millimeter wave carrier frequencies. Massive MIMO (multiple-input multiple-output) deployments, moreover, allow to spatially multiplex multiple data streams to occupy the same time and frequency resources enabling increase of spectral efficiency of radio communication systems. However, the large millimeter wave antenna arrays typically provide beams with very narrow beamwidths meaning that the transmitter and the receiver side antenna arrays need to be carefully oriented to face each other in order to benefit from the high antenna gain. This presents a significant challenge in designing millimeter wave communication systems.

BRIEF DESCRIPTION

According to an aspect, there is provided the subject matter of the independent claims. Embodiments are defined in the dependent claims.

One or more examples of implementations are set forth in more detail in the accompanying drawings and the description below. Other features will be apparent from the description and drawings, and from the claims.

BRIEF DESCRIPTION OF DRAWINGS

In the following, example embodiments will be described in greater detail with reference to the attached drawings, in which.

DETAILED DESCRIPTION OF SOME EMBODIMENTS

The following embodiments are only presented as examples. Although the specification may refer to "an", "one", or "some" embodiment(s) and/or example(s) in several locations of the text, this does not necessarily mean that each reference is made to the same embodiment(s) or example(s), or that a particular feature only applies to a single embodiment and/or example. Single features of different embodiments and/or examples may also be combined to provide other embodiments and/or examples.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
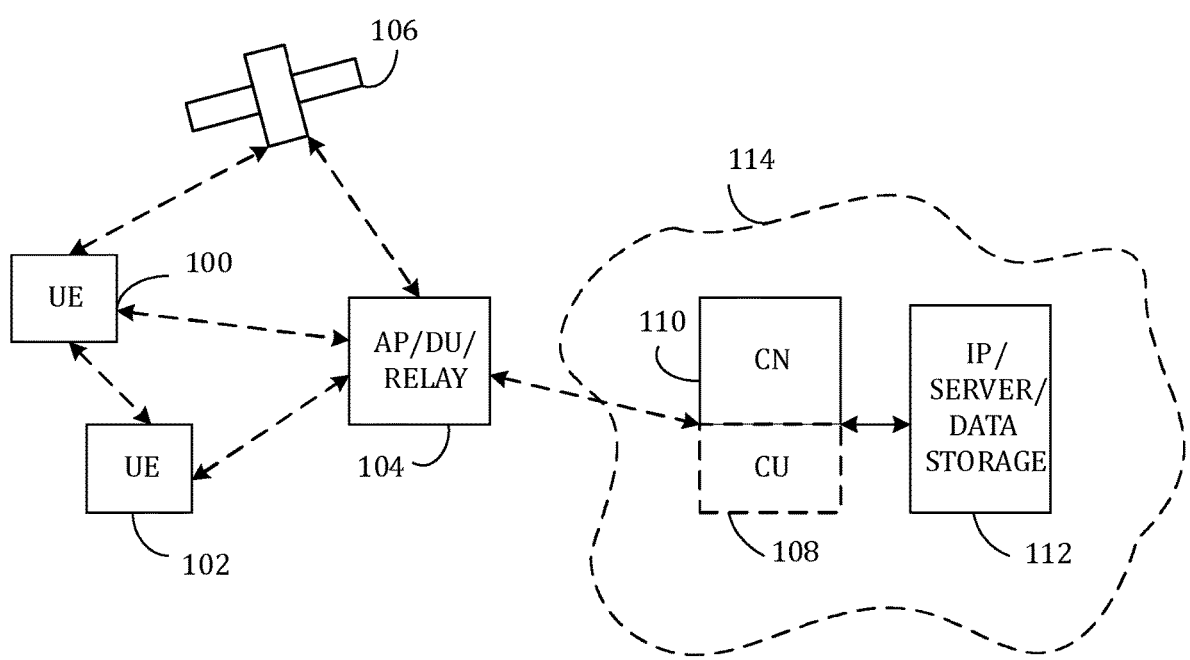
FIG. 1 illustrates an exemplified wireless communication system.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage. A communications system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g) NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyberphysical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

It should be understood that, in FIG. 1, user devices are depicted to include 2 antennas only for the sake of clarity. The number of reception and/or transmission antennas may naturally vary according to a current implementation.

Additionally, although the apparatuses have been depicted as single entities, different units, processors and/or memory units (not all shown in FIG. 1) may be implemented.

5G enables using multiple input—multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz—cmWave, below 6 GHz—cmWave—mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home(e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

One key element necessary in overcoming high path and penetration losses of millimeter wavelengths and thus achieving high throughput broadband communications envisioned for 5G (NR) communication systems like the one shown in FIG. 1 is the use of beamforming techniques. Beamforming techniques employ an array antenna comprising a plurality of antenna elements, for example, in a rectangular or square configuration. By tuning the phase and/or amplitude of the signals fed to each antenna element, different antenna patterns may be produced due to the electromagnetic waves produced by the individual antenna elements interfering with each other constructively and destructively in different directions. Due to reciprocity, the same principle applies equally in reception. In particular, the radiation pattern of the antenna array may be tuned so that a narrow main beam of the radiation pattern is directed to different directions (e.g., different directions defined through azimuth and/or elevation angles). In other words, the electromagnetic waves may be focused in a desired direction in transmission and/or the electromagnetic waves may be received only from a desired direction in reception. In addition to the direction of the main lobe, the sidelobe levels and the nulls of the pattern may also be controlled.

In conventional (or fixed) beamforming, a fixed set of complex weighting factors (i.e., amplitude and phase conversions) are applied to the signals fed to the antenna elements based on the information on the direction of interest to focus the beam to said direction of interest. In adaptive beamforming, this information is combined with properties of the signals received by the array. However, in some scenarios the position of the target transmitter transmitting a signal or the position of the target receiver receiving a signal is unknown to the receiver or transmitter, respectively. In such cases, before a beam may be formed and the transmitted signal may be received, it may, first, be detected to which direction the signal should be transmitted or from which direction the signal is to be received. Multiple different spectrum sensing solutions have been proposed for achieving this.

In line-of-sight (LOS) conditions, the TX and RX beams may be pointed simply to the direction of the targeted receiver and transmitter, respectively. To achieve this, the position of the target receiver/transmitter relative to the source transmitter/receiver often in practice needs to be estimated. The estimation accuracy depends on various factors, including estimation scheme, bandwidth and periodicity of measurements, deployment details such as the system geometry (relative positions of the network nodes and the target device) and the mobility states of the nodes, as well as the prediction horizon in time. The TX/RX beam may subsequently be formed based on the estimated location of the target receiver/transmitter, respectively. This type of beamforming is generally called location-based beamforming.

The embodiments to be discussed below provide improvements on conventional location-based beamforming techniques (using, e.g., beam sweeping) by utilizing a statistical approach. Specifically, the embodiments employ a position estimate likelihood distribution of the target device (i.e., a target receiver or a target transmitter) in forming the beam in order to make more informed decisions on how the beam should be formed to comply with given requirements and constraints. The described ideas are mainly applicable to LOS communication scenarios but may also be applied to other communication scenarios such as non-line-of-sight (NLOS) and obstructed LOS.

Figure 2:
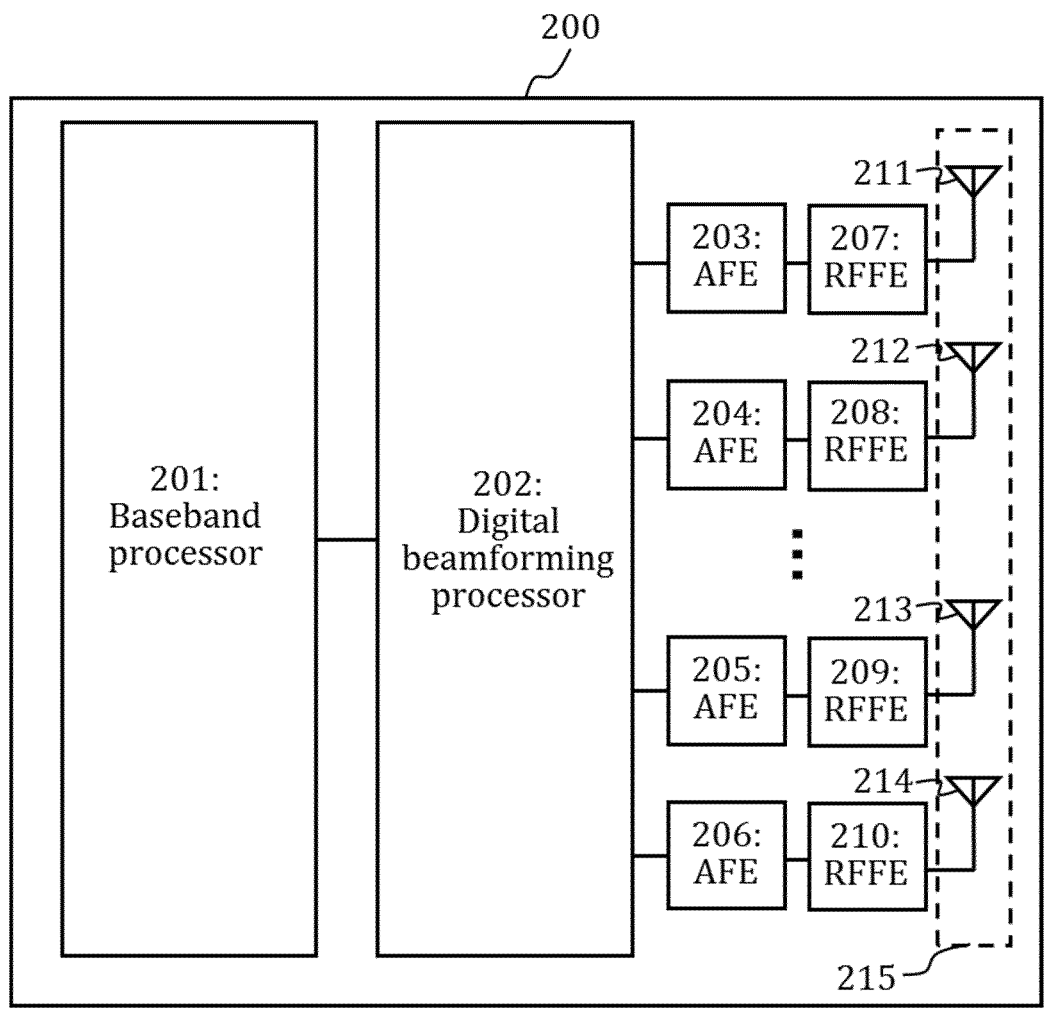
FIGS. 2 and 3 illustrate exemplified beamforming transmitter/receiver architectures.

FIG. 2 illustrates a beamforming (antenna) system 200 according to an embodiment for overcoming at least some of the problems described above. The illustrated beamforming antenna system may be configured to perform beamforming as well as beam scanning and/or beam detection. The beamforming antenna system according to embodiments comprises at least an antenna array 215 comprising a plurality of antenna elements 211, 212, 213, 214, a plurality of radio frequency, RF, front ends (RFFEs) 207, 208, 209, 210, a plurality of analog front ends (AFEs) 203, 204, 205, 206, a digital beamforming processor 202 and a baseband processor 201. The illustrated beamforming system 200 may correspond to a radio transmitter, a radio receiver or a radio transceiver.

Referring to FIG. 2, the beamforming antenna system comprises an antenna array 215 comprising a plurality of antenna elements 211, 212, 213, 214 for transmitting and/or receiving electromagnetic waves. While a linear antenna array is depicted for simplicity in FIG. 2, the antenna array 215 may by any one-dimensional or two-dimensional antenna array. For example, the antenna array 215 may be a square antenna array consisting of N×M antenna elements (e.g., square microstrip antenna elements) arranged periodically, where N and M are any positive integers. N and M may or may not be equal. In other embodiments, the shape of the antenna array may be, for example, polygonal, spherical or elliptical and/or the antenna elements may not be arranged along a Cartesian grid but along a more general regular grid or even curvilinear grid. Further, the individual microstrip antenna elements may have almost any shape, for example, rectangular, polygonal, spherical or elliptical shape. In some embodiments, the antenna elements may not even be microstrip antenna elements but other antenna elements, for example, dipole antenna elements.

Each antenna element 211, 212, 213, 214 may be connected to a RF front end 207, 208, 209, 210 (possibly via an isolator). The plurality of RF front ends 207, 208, 209, 210 may be configured to convert radio frequency signals received from the plurality of antenna elements 211, 212, 213, 214 to baseband signals in receive paths of the plurality of RF front ends 207, 208, 209, 210 (i.e., in a radio receiver or transceiver) and/or to convert baseband signals from the plurality of analog front ends 203, 204, 205, 206 to radio frequency signals for transmission in transmit paths of the plurality of RF front ends 207, 208, 209, 210 (i.e., in a radio transmitter or transceiver). Each RF front end 207, 208, 209, 210 may comprise in a transmit path of the RF front end 207, 208, 209, 210 one or more power amplifiers, one or more upconverters (i.e., upconverting RF mixers) and/or one or more RF filters and in a receive path of the RF front end 207, 208, 209, 210 one or more RF filters, one or more downconverters (i.e., downconverting RF mixers) and one or more (low noise) amplifiers. The RF filters may, specifically, comprise one or more band-pass filters for reducing the image response of the RF mixers. Each RF front end may further comprise a local oscillator for providing a local oscillator signal for the up- and/or downconverters. The baseband processing apparatus 201 may be configured to control gain (i.e., gain of at least one power or low noise amplifier) and/or clock of each RF front end 207, 208, 209, 210. The gain may be controlled, for example, by controlling a control voltage of one or more power or low noise amplifiers while the clock may be controlled by simply providing a clock signal.

The plurality of analog front ends 203, 204, 205, 206 may be configured to convert the analog baseband signals received via the plurality of RF front ends 207, 208, 209, 210 to digital baseband signals in receive paths of the plurality of analog front ends 203, 204, 205, 206 (i.e., in a radio receiver or transceiver) and/or to convert digital baseband signals to digital baseband signals for transmission via the plurality of RF front ends 207, 208, 209, 210 in transmit paths of the plurality of analog front ends 203, 204, 205, 206 (i.e., in a radio transmitter or transceiver). Each analog front end 203, 204, 205, 206 may comprise, for example, in a transmit path of the analog front end 203, 204, 205, 206 one or more digital-to-analog converters and/or one or more filters and/or in a receive path of the analog front end 203, 204, 205, 206 one or more of filters, one or more gain amplifiers and/or one or more analog-to-digital converters.

The (digital) beamforming processor 202 (later a beamforming processing apparatus) may be configured to control beamforming (and scanning) in one direction or two orthogonal directions, i.e., in an azimuth direction and/or in an elevation direction. Said control may be achieved by controlling phase shifting applied to (digital) baseband signals fed to the plurality of analog front ends 203, 204, 205, 206 in transmission and to (digital) signals received from the plurality of analog front ends 203, 204, 205, 206 in reception. By applying different phase shifts to signals transmitted to or received from different analog front ends, transmission/reception beams with different azimuth and/or elevation pointing directions may be realized enabling the beam scanning operation in azimuth and/or elevation. The beamforming processor may also control which antenna elements 211, 212, 213, 214, of the antenna array 215 are active (i.e., in use). Further, the beamforming processor 202 may be configured to perform beamforming optimization based on the estimated location of the target receiver(s) (in the case of a transmitter or a transmitting transceiver) or the estimated location of the target transmitter(s) (in the case of a receiver or a receiving transceiver) and the uncertainty in said estimation, properties of the antenna array 215 and pre-defined (minimum) optimization criteria according to embodiments to be discussed below.

The baseband processing apparatus 201 may be configured to generate a digital baseband signal to be fed via the beamforming processor 202 to the plurality of analog front ends 203, 204, 205, 206 for transmission (i.e., in a transmitter or a transceiver) and to process a baseband signal received via the beamforming processor 202 from the plurality of analog front ends 203, 204, 205, 206 in reception (i.e., in a receiver or a transceiver).

Figure 3:
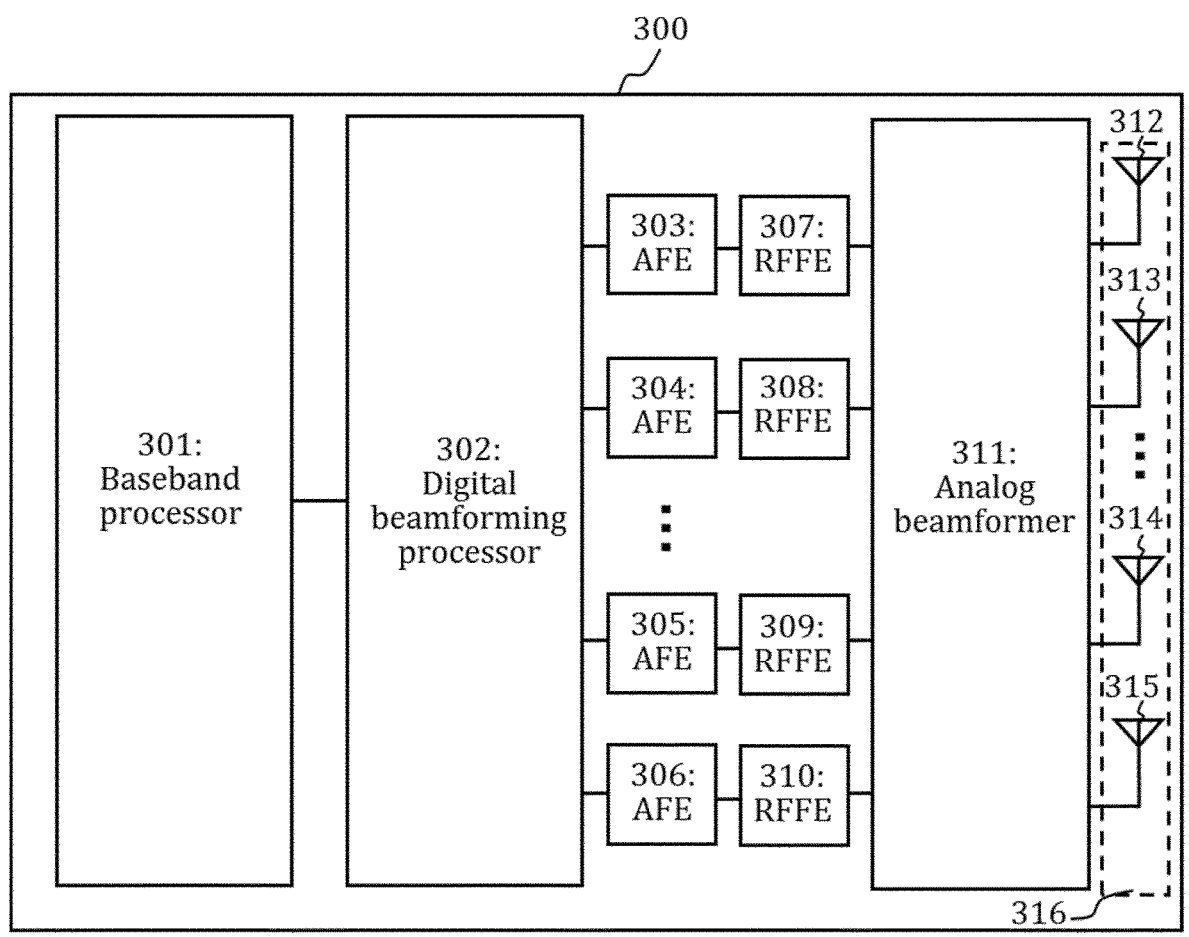

While FIG. 2 illustrates a digital beamforming solution according to embodiments, FIG. 3 illustrates a hybrid beamforming solution according to embodiments. The elements 301, 303 to 310, 312 to 316 may correspond, respectively, to elements 201, 203 to 210, 211 to 215 of FIG. 2.

In hybrid beamforming, the beamforming is performed partly by a digital beamforming processor 302 and partly by an analog (or specifically RF) beamforming processor 311 (or simply analog beamformer). This partitioning of the beamforming operations between digital and analog domains enables reducing the complexity of the digital beamforming algorithms executed by the digital beamforming processor 302.

The hybrid beamforming may be used to reduce the number of RF chains (i.e., to reduce the number of RF and analog front-ends 303, 307, 304, 308, 305, 309, 306, 310). In purely digital beamforming illustrated in FIG. 2, the number of RF chains is equal to the number of antenna elements. In hybrid beamforming, the analog beamformer 311 may be used to convert, in transmission, a smaller number of input signals to a larger number of output signals, the number of output signals being equal to the number of antenna elements 312, 313, 314, 315. In reception, the operation is reversed, that is, a larger number of input signals is converted to a smaller number of output signals. To achieve this functionality, the analog beamformer 311 may comprise, for example, one or more phase shifters, one or more dividers and/or one or more combiners.

For example in transmission using a so-called full-complexity structure for the analog beamformer 311, each input signal of the analog beamformer 311 may be divided into N copies of itself and different phase shifting may be applied to each copy (N being an integer larger than one). The phase-shifted input signals may, then, be combined in different ways to form the output signals to be fed to the antenna elements. Each output signal may be a linear combination of all input signals (that is, phase-shifted input signals) of the analog beamformer 311. Complexity reduction at the price of a reduced performance may be achieved if each RF chain is connected only to a subset of antenna elements 312, 313, 314, 315. Similar implementations may be realized also for reception by, e.g., replacing combiners with dividers and vice versa.

To give another example, in transmission using a so-called subarray structure for the analog beamformer 311, each input signal of the analog beamformer 311 may be divided into M copies of itself and different phase shifting may be applied to each copy (M being an integer larger than one). The phase-shifted input signals may, then, be fed directly to the antenna elements. Each set of antenna elements receiving signals deriving from a single input signal of the analog beamformer 311 may be considered a subarray of the antenna array 316. Similar implementations may be realized also for reception by, e.g., replacing dividers with combiners.

The embodiments to be discussed below may be carried out either by the digital beamforming processor 202 of FIG. 2 or by the digital beamforming processor 302 of FIG. 3.

Location-based beamforming (or geometric beamforming) as discussed above are beamforming solutions which are based on estimating the position of the target receiver/transmitter and using the estimated position (i.e., a single position or pointing direction) for forming the most suitable beam for the given scenario. However, the target device position used for the beamforming is always only an estimate of the actual position of the target transmitter/receiver. The more accurate the position estimate is, the more directive beams may be used in order to maximize the received signal-to-noise ratio (SNR) (or received signal level), assuming a fixed number of antenna elements and transmit power. Conversely, the less accurate the position estimate is, the less directive beams may be safely used so as to avoid misalignment between the TX and RX beams and consequent drastic drop in the effective SNR. Therefore, it would be beneficial for forming the most suitable beam for a given scenario to take into account not only the estimated position of the target device but also the position uncertainty associated with said target device. Besides improving the system performance, this new approach enables a wide range of new opportunities for optimization of radio link and system level parameters, which are yet unreachable with the current beamforming techniques.

Figure 4:
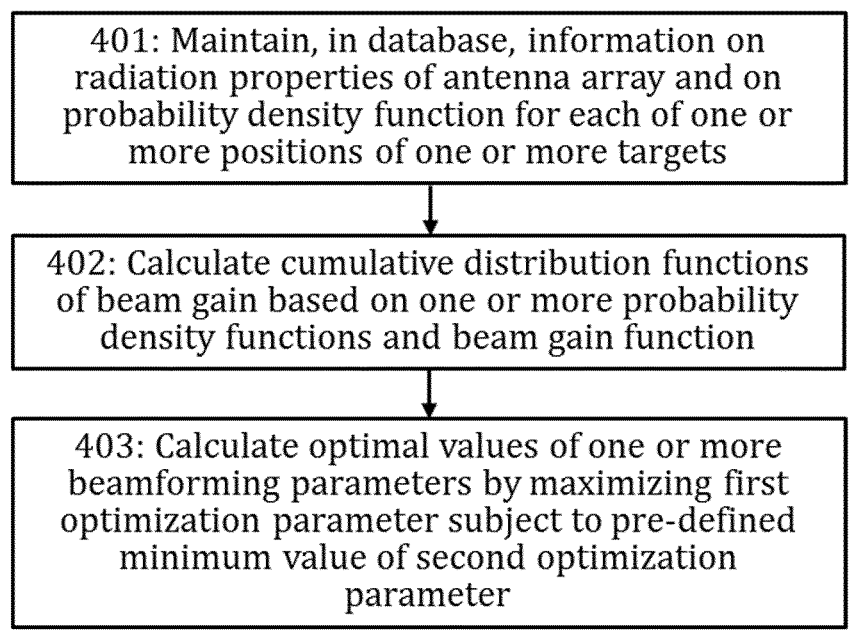
FIGS. 4, 5A, 5B, 6A, 6B, 7 and 8 illustrate exemplary processes according to embodiments.

FIG. 4 illustrates a process according to an embodiment for performing beamforming taking into account the position uncertainty of the target devices (i.e., target receivers/transmitters). The illustrated process may be performed by a beamforming processing apparatus or specifically the beamforming processing apparatus 202 of FIG. 2 or the beamforming processing apparatus 302 of FIG. 3. In some embodiments, the entity performing the process may be a radio transmitter, a radio receiver or a radio transceiver as illustrated in FIG. 2 or 3 and/or element 104 (or a sub-element therein) of FIG. 1. In some embodiments, each target device may correspond to any of terminal devices 100, 102 of FIG. 1.

Referring to FIG. 4, it is initially assumed in block 401 that the beamforming processing apparatus maintains, in a database, information on radiation properties of the antenna array. The radiation properties of the antenna array may comprise at least sets of values of one or more beam parameters defining a shape of each beam producible by the antenna array and a two-dimensional or three-dimensional beam gain function defined to depend on the one or more beam parameters. Each beam may be formed by one or more antenna elements of the antenna array, each antenna element being fed with a pre-defined phase shift (which may be different for different antenna elements forming the beam). The one or more beam parameters may comprise, for example, an azimuthal beamwidth and/or an elevational beamwidth. The aforementioned beamwidths may be, e.g., 3 dB beamwidths (i.e., half-power beamwidths), 6 dB beamwidths or any n dB beamwidths, where n is any positive real number. In some embodiments, the one or more beam parameters may comprise one or more azimuthal beamwidths and/or one or more elevation beamwidths as described above (e.g., a 3 dB azimuthal beamwidth and a 6 dB azimuthal beamwidth). The one or more beam parameters may, in addition or alternative to the beamwidth(s), comprise a number of the antenna elements used for forming a given beam or, in the case of a two-dimensional antenna array, a number of the antenna elements used for forming the beam along a first direction (i.e., first direction along the antenna array) and a number of the antenna elements used for forming the beam along a second direction orthogonal to the first direction (i.e., a second direction along the antenna array). In other embodiments, for example, where a linear antenna array is used, the one or more beam parameters may consist simply of a single beamwidth.

In embodiments where fully digital beamforming (as illustrated in FIG. 2) is employed, the one or more beam parameters may comprise a vector comprising values for one or more beamforming weights (i.e., beamforming weight vector). Each beamforming weight of the one or more beamforming weights is applied to a signal fed to and/or received from one of the antenna elements of the antenna array so that the phase shifting (and potentially also amplitude adjustment) for that particular antenna element may be manipulated. In other embodiments where codebook-based hybrid beamforming (as illustrated in FIG. 3) is employed, the one or more beam parameters may comprise an index pointing to a specific entry in a codebook.

The beam gain function (i.e., the antenna gain function for a particular beam produced by the antenna array) may be defined as $g(x,\theta)$, where x is a position vector with $x \in \mathbb{R}^2$ or $x \in \mathbb{R}^3$ and $\theta$ is a beam parameter vector corresponding to the one or more beam parameters. The beam parameter vector may be defined according to the above discussion on the one or more beam parameters, e.g., according to $\theta = (\theta_{az,3db}, \theta_{el,3db}) = (5°, 10°)$ or $\theta = \theta_{3db} = 5°$. For example, with a conventional 2D beamformer under LOS (Line-Of-Sight) conditions and for a given $\theta$, e.g., $\theta = \theta_{3db} = 5°$, all positions $x \in \mathbb{R}^2$ which share the same azimuth angle, have identical beam gains, that is, $g(x,\theta) = g(\varphi,\theta)$, where $\varphi$ is the azimuth angle.

It is further assumed in block 401 that the beamforming processing apparatus maintains, in the database, information on a probability density function for each of one or more positions of one or more target devices. The probability density functions may be written as $p_x(x)$ with $x \in \mathbb{R}^2$ (for two-dimensional mapping) or $x \in \mathbb{R}^3$ (for three-dimensional mapping). The probability density functions may have been estimated using a positioning or tracking method, which provides the probability density function (or a corresponding scaled likelihood function) of the target device position. Examples of positioning or tracking methods which may be used are discussed in detail in relation to later embodiments.

The position estimate $x_{est}$ for each target device may be easily derived from the corresponding probability density function using $x_{est}=\arg_x [\max\{p_x(x)\}]$. The beamforming processing apparatus may also maintain, in the database, separately the position estimate for each target device. Each probability density function (and position estimate) may be defined by using either absolute global coordinates (e.g., latitude, longitude and altitude) or by using local coordinates relative to the known positions of network nodes.

The beamforming processing apparatus calculates, in block 402, for each set of values of the one or more beam parameters, one or more cumulative distribution functions of beam gain based on the one or more probability density functions and the beam gain function. The beamforming processing apparatus may perform the calculation of each cumulative distribution function of the beam gain for a position of a target device according to $$F(\gamma,\theta)=\int_\Omega p_x(x)dx_1 \ldots dx_D, \quad (1)$$

where $F(\gamma,\theta)$ is a cumulative distribution function depending on the (desired) beam gain $\gamma$ and on the vector representing the set of values of the one or more beam parameters $\theta$, $p_x(x)$ is the probability density function for the position $x$ of the target device, $\Omega$ is defined as $\Omega=\{x\in\mathbb{R}^D|g(x,\theta)\leq\gamma\}$, $x_i$ is the ith element of the position vector $x$ and $D$ is the number of dimensions of the beam gain function (defined to be D=2 or D=3). $g(x,\theta)$ is the beam gain function as described above. The set $\Omega$ covers globally all possible coordinates for the target device position. In practice, the coordinate space $\Omega$ may, however, be limited to a smaller region, which covers the most significant part of the probability mass of $p_x(x)$. The cumulative distribution function may be written alternatively as $$F(\gamma,\theta)=\int_{-\infty}^\gamma p_g(\lambda,\theta)d\lambda, \quad (2)$$

where $p_g(\lambda,\theta)$ is a probability density function of beam gain for the set of values of the one or more beam parameters $\theta$ and for beam gain $\lambda$ (being a temporary variable for integration). The probability density function $p_g(\gamma,\theta)$ may be written as $$p_g(\gamma,\theta) = \frac{\partial}{\partial\gamma}\int_\Omega p_x(x)dx_1 \ldots dx_D. \quad (3)$$

After calculating the one or more cumulative distribution functions of the beam gain, the beamforming processing apparatus calculates, in block 403, one or more optimal values of the one or more beam parameters defining an optimal beam by maximizing a first optimization parameter defined based on the one or more cumulative distribution functions subject to a pre-defined minimum value of a second optimization parameter. The first and second optimization parameters may be defined in a variety of ways. One of the first and the second optimization parameters may relate to (or describe or define) a service probability of at least one target device and the other to a beam gain of said at least one target device. In other words, the beamforming processing apparatus may maximize service probability or beam gain subject, respectively, to a pre-defined minimum value of beam gain or service probability. Subsequently, the beamforming processing apparatus may find the value(s) of the one or more beam parameters corresponding to the maximized quantity (i.e., service probability or beam gain).

The service probability $\eta$ may be defined as a probability for achieving at least a pre-defined value $\gamma_{th}$ for a beam gain for a target device (i.e., achieving the pre-defined value or a larger value). The service probability may be written as $\eta=1-F(\gamma_{th},\theta)$. In practical systems, a link budget may be defined based on some assumption of $\gamma_{th}$ allowing the communications link to operate with a specific outage probability. Here, the definition of service probability defines the probability that this beamforming gain $\gamma_{th}$ is achieved, thus fulfilling the link budget requirement. In other words, the service probability may be considered as the probability for fulfilling the pre-defined link budget. The service probability may be defined mathematically as $\eta\in\{u|u\in\mathbb{R},0\leq u\leq 1\}$ and the beam gain as $\gamma\in\{u|u\in\mathbb{R}, u\leq \text{maximum achievable beam gain}\}$.

In order to optimize the beamforming performance with a desired (minimum) service probability $\eta$, the one or more beam parameters $\theta$ are chosen so that the achieved beam gain is maximized while still satisfying the desired minimum service probability. Thus, the one or more optimal values of the one or more beam parameters $\theta$ are calculated by maximizing the inverse cumulative distribution function (also known as quantile function) at $1-\eta$ over the feasible values of $\theta$. In other words, if the first optimization parameter is defined to be the beam gain for the target device and the second optimization parameter is defined to be the service probability for the target device, the beamforming processing apparatus may calculate, in block 403, the one or more optimal values of the one or more beam parameters $\hat{\theta}$ using the equation $$\hat{\theta} = \arg\max_\theta \{F^{-1}(1-\eta_{th},\theta)\}, \quad (4)$$

where $F^{-1}(1-\eta_{th},\theta)$ is an inverse function of a cumulative distribution function corresponding to the beam gain to be maximized $\gamma_{max}$ and $\eta_{th}$ is the pre-defined minimum value of the service probability. The maximum beam gain value $\gamma_{max}$ which may be achieved with the desired service probability is given by $$\gamma_{max}=F^{-1}(1-\eta_{th},\hat{\theta}). \quad (5)$$

The alternative performance optimization criterion for the beam parameter $\theta$ is to achieve at least certain desired minimum beam gain $\gamma_{th}$, as mentioned above. In this case, the one or more optimum values of the one or more beam parameters $\theta$ are found by maximizing the service probability $\eta$ for the desired beam gain $\gamma_{th}$. In other words, if the first optimization parameter is defined to be the service probability for the target device of the one or more target devices and the second optimization parameter is defined to be the beam gain for the same target device, the beamforming processing apparatus may calculate, in block 403, the one or more optimal values of the one or more beam parameters $\hat{\theta}$ using $$\hat{\theta} = \arg\max_\theta \{1 - F(\gamma_{th},\theta)\}, \quad (6)$$

wherein $1-F(\gamma_{th},\theta)$ corresponds to the service probability to be maximized $\eta_{max}$ and $\gamma_{th}$ is the pre-defined minimum value of the beam gain.

Figure 5A:
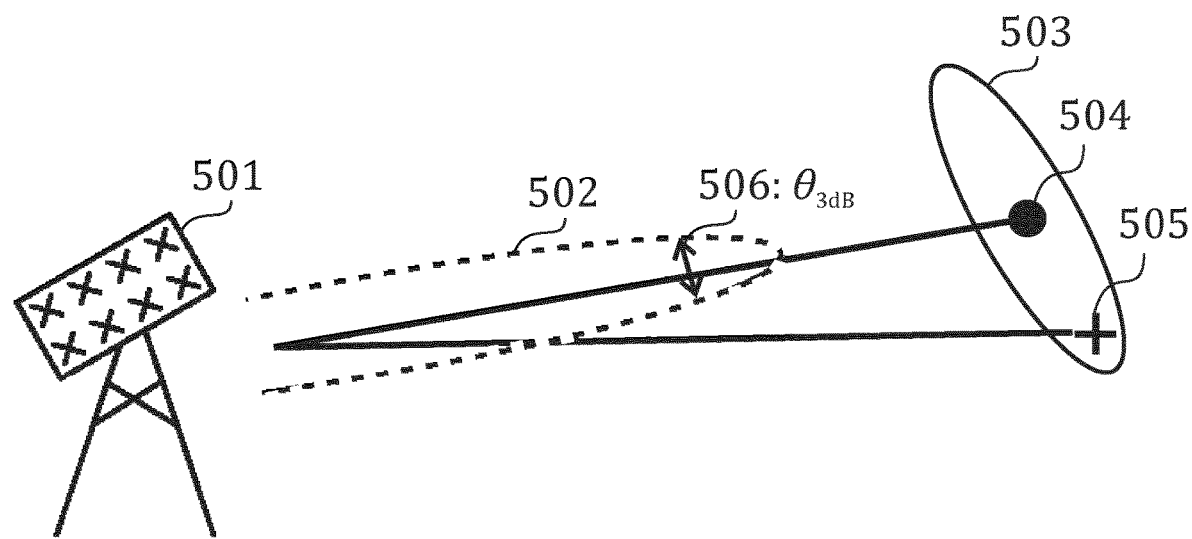

Assuming ideal knowledge of the target device position, applying extremely narrow beamwidth enables very large beamforming gains. However, due to the uncertainty of the estimated target device position, utilization of excessively narrow beams introduces service outages, as the beam may miss the true target device position. Thus, there is a distinct trade-off between the achievable beam gain and the service probability, as narrow beams result in higher beam gains with a reduced service probability, and wide beams result in lower beam gains with increased service probability. An example of this scenario is given in FIG. 5A, where conventional position-based beamforming operation is shown. In FIG. 5A, the beam gain (illustrated by beam pattern 502 defined by a given 3 dB beamwidth $\theta_{3db}$ 506) provided by the radio transmitter or receiver 501 towards the assumed target device position 504 (i.e., target receiver or transmitter position, respectively) is maximized not taking into account the uncertainty in the estimation. This operation provides, in this particular example, significantly smaller beamforming gain compared to the case where the beam is pointed to the actual target device position 505 due to the beamforming resulting a relatively narrow beam. The ellipse 503 illustrates the uncertainty in the position of the target receiver/transmitter (e.g., the target device may be estimated to be within said ellipse 503 with 99% certainty). In fact, the antenna gain may even be negative in dB scale if the actual target device position is close to a null-response appearing in beamformed antenna gain responses.

Figure 5B:
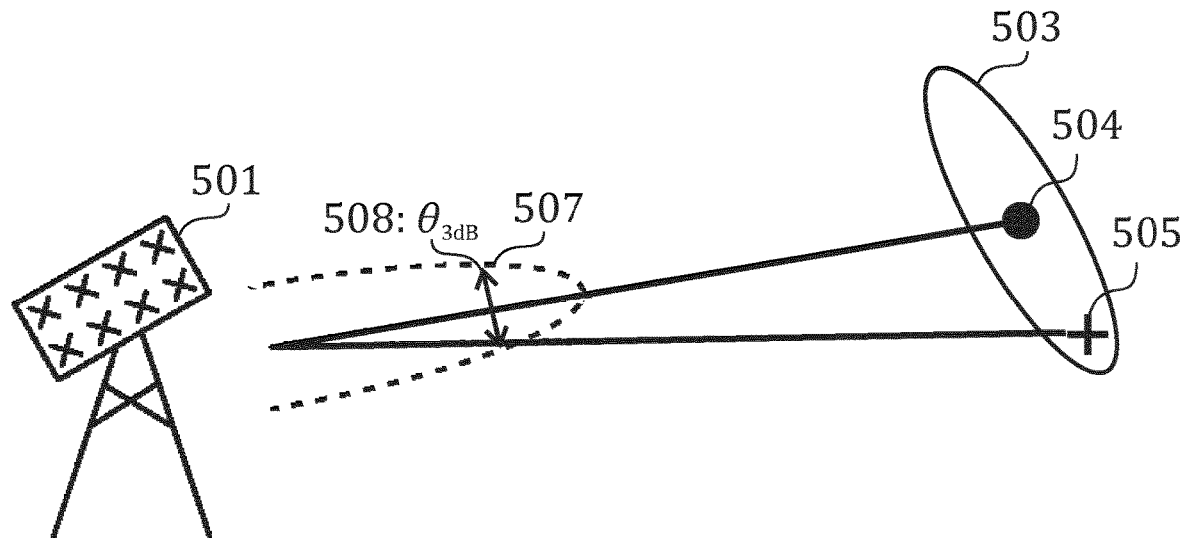

FIG. 5B illustrates beamforming which maximizes the service probability subject to a minimum allowed value of beam gain while taking into account the position uncertainty 503, according to embodiments discussed above. In this case, the result of the beamforming process is, due to the considerable uncertainty in the position estimate, a beam pattern 507 characterized by a larger beamwidth 508 but lower maximum beam gain. Therefore, even if the position estimate 504 is not very close to the actual position 505 of the target device (as in the illustrated case), the signal may still be transmitted successfully with an acceptable SNR.

In embodiments discussed above in relation to equations (4) to (6) and illustrated in FIGS. 5A and 5B, it was assumed that there is only a single target receiver/transmitter or at least that only a single target receiver/transmitter at a time is taken into account in the calculation of the optimal beam parameter(s). Obviously, the beamforming process (or in particular block 403 of FIG. 4) may be repeated for the other target receivers/transmitters in order to provide service to all the target receiver/transmitters. However, it may often be preferable if multiple users (UE) could be served simultaneously using a single beam. Such a multi-user scenario may be, for example, point-to-multipoint multicasting where a single transmitting beam needs to be optimized for transmission of a group-common message for multiple user equipment. To achieve this functionality, the beam parameter optimization may be extended to multi-user scenarios by defining a supplementary objective function $\Psi(\bullet)$ which considers target-wise performance criteria.

In an analogous manner with embodiments associated with equations (4) and (6), the beamforming optimization may be carried out in two alternative ways also in the multi-user scenario. If the first optimization parameter is defined to be the combined beam gain for one or more target devices (i.e., one or more target transmitter or one or more target receivers) and the second optimization parameter is defined to be the service probability for the one or more target devices the beamforming processing apparatus may calculate, in block 403 of FIG. 4, the one or more optimal values of the one or more beam parameters $\hat{\theta}$ using the equation $$\hat{\theta} = \underset{\theta}{\mathrm{argmax}}\{\Psi(F_{tg,1}^{-1}(1-\eta_{th,1},\theta),\ldots,F_{tg,K}^{-1}(1-\eta_{th,K},\theta))\}, \quad (7)$$

where K is the number of the one or more target devices, $F_{tg,n}^{-1}(1-\eta_{th,n},\theta)$ is an inverse function of a cumulative distribution function corresponding to the beam gain to be maximized $\gamma_{max}$ for the nth target device, $\eta_{th,n}$ is the pre-defined minimum value of the service probability for the nth target device, n having values n=1, ..., K. The pre-defined minimum value of the service probability may be defined independently for each target device. In some embodiments, the pre-defined minimum value of the service probability may be defined to be the same for all target devices, that is, $\eta_{th,n}=\eta_{th}$ for all n=1, ..., K. The supplementary objective function $\Psi(\bullet)$ may be defined so that it reduces to the objective function of equation (4) when only a single target device is to be targeted (i.e., K=1).

The supplementary objective function $\Psi(\bullet)$ may be a function defined as a linear combination of its arguments. In other words, the supplementary objective function $\Psi(\bullet)$ may be defined as $$\Psi(F_{tg,1}^{-1}(1-\eta_{th,1},\theta),\ldots, \qquad (8)$$
$$F_{tg,K}^{-1}(1-\eta_{th,K},\theta)) = w_1 F_{tg,1}^{-1}(1-\eta_{th,1},\theta) + \ldots + w_K F_{tg,K}^{-1}(1-\eta_{th,K},\theta),$$

where $w_i$ are real-valued weighting factors with i having values i=1, 2, ..., K−1, K. The weighting factors may be defined to be negative, zero or positive and they may be defined to be equal to each other or unequal to each other. If a weighting factor is defined to be negative for a target receiver, the optimization process in block 403 of FIG. 4 actively tries to minimize the gain value of the beam in the direction of the target receiver corresponding to said negative weighting factor. Such weighting factors may act as penalty terms for interference aggressors/victims to optimize interference conditions within the network.

Alternatively, if the first optimization parameter is the combined service probability for one or more target devices and the second optimization parameter is the beam gain for the one or more target devices, the beamforming processing apparatus may calculate, in block 403 of FIG. 4, the one or more optimal values $\hat{\theta}$ using $$\hat{\theta} = \underset{\theta}{\mathrm{argmax}}\{\Psi(1-F_{tg,1}(\gamma_{th,1},\theta),\ldots,1-F_{tg,K}(\gamma_{th,K},\theta))\}, \quad (9)$$

wherein $F_{tg,n}(1-\eta_{th,n},\theta)$ is a cumulative distribution function for the nth target device, $1-F(\gamma_{th,n},\theta)$ corresponds to the service probability to be maximized $\eta_{max,n}$ for the nth target device and $\gamma_{th,n}$ is the pre-defined minimum value of the beam gain for the nth target device, n having values n=1, ..., K. The pre-defined minimum value of the beam gain may be defined independently for each target device. In some embodiments, the pre-defined minimum value of the beam gain may be defined to be the same for all target devices, that is, $\gamma_{th,n}=\gamma_{th}$ for all n=1, ..., K. The supplementary objective function $\Psi(\bullet)$ may be defined so that it reduces to the objective function of equation (6) when only a single target device is to be targeted (i.e., K=1). The supplementary objective function $\Psi(\bullet)$ may be defined as described above.

Information on one or more weighting factors for the one or more target devices may be maintained in the database. In some embodiments, one or more values of a (pre-defined) priority metric may be maintained in the database, instead or in addition, and the one or more weighting factors may be calculated by the beamforming processing apparatus based on said one or more values of the priority metric. The beamforming processing apparatus may apply, in the linear combination of the supplementary objective function, each of said one or more weighting factors to an argument of the supplementary objective function associated with a corresponding target device.

Figure 6A:
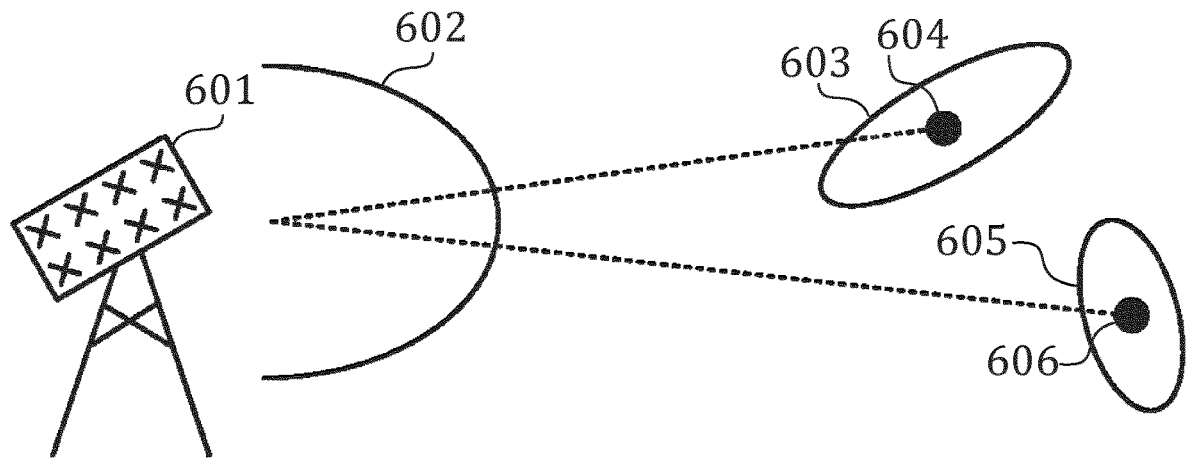
Figure 6B:
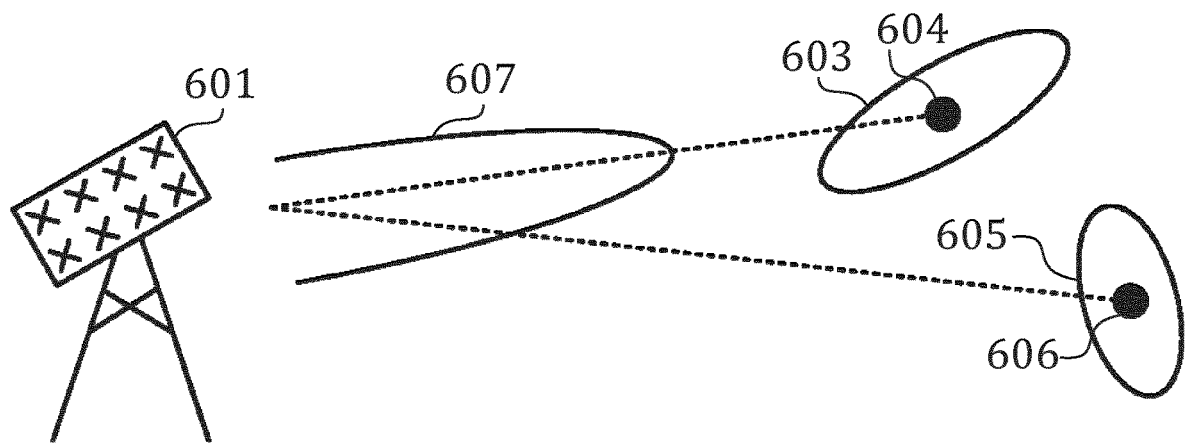

By selecting the weighting factors so as to have different values for different target devices, the service for some target receivers/transmitters may be prioritized over other target receivers/transmitters. This concept is illustrated in FIGS. 6A and 6B showing how different beams may be formed in the same scenario if the weighting factors are chosen differently. In the illustrated scenario, two target receivers/transmitters are to communicate simultaneously with a source transmitter/receiver 601. Similar to FIGS. 5A and 5B, filled circles 604, 606 are used to denote the estimated positions of the corresponding target devices while the ellipses 603, 605 depict the uncertainty in the position estimate. The illustrated example corresponds specifically to the embodiment associated with equation (7).

FIG. 6A illustrates an equal beam gain scenario where, as the name implies, the weighting factors are equal for all target devices. Consequently, the beam 602 formed by the beamforming processing apparatus of the transmitter/receiver 601 has a relatively wide beamwidth so that both target devices may be served equally well.

FIG. 6B illustrates an unequal beam gain scenario where the weighting factors are not equal for all target devices. Specifically, in the illustrated case the weighting factors $w_1$ and $w_2$, respectively, for the first target 604 and the second target 606 are different so that $w_1$ is larger than $w_2$. Consequently, the beam 607 formed by the beamforming processing apparatus of the transmitter/receiver 601 has a relatively narrow beamwidth and is directed to a large extent towards the first target 604.

Figure 7:
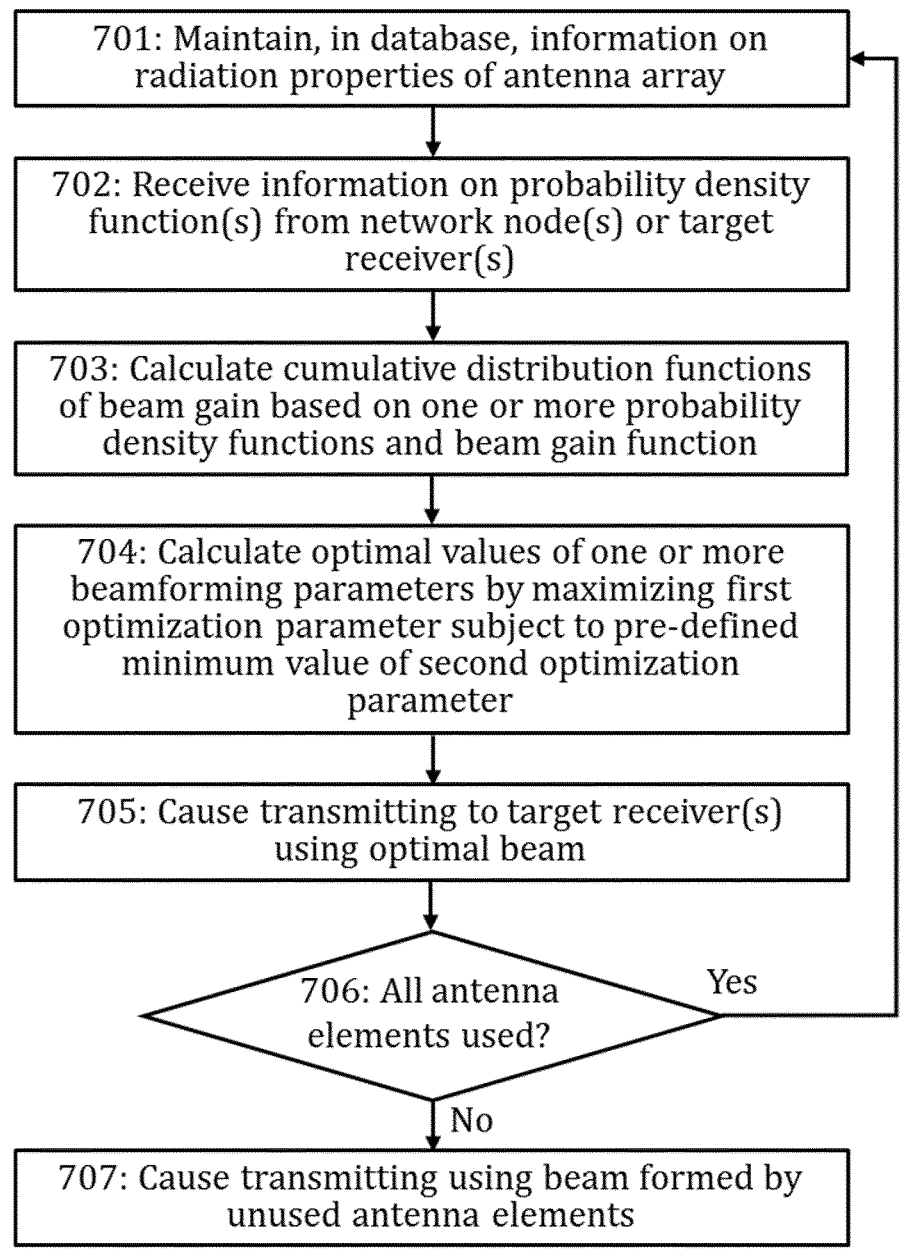

FIG. 7 illustrates an alternative process according to an embodiment for performing beamforming taking into account position uncertainty of the target devices. The illustrated process may be performed by a beamforming processing apparatus for a radio transmitter or transceiver or specifically by the beamforming processing apparatus 202 of FIG. 2 (the apparatus 200 acting as a radio transmitter or transceiver) or the beamforming processing apparatus 302 of FIG. 3 (the apparatus 300 acting as a radio transmitter or transceiver). In some embodiments, the entity performing the process may be a radio transmitter or transceiver 200, 300 as illustrated in FIG. 2 or 3, respectively, and/or element 104 (or a sub-element therein) of FIG. 1.

Referring to FIG. 7, it is initially assumed in block 701 that the beamforming processing apparatus maintains, in a database, at least information on radiation properties of the antenna array (defined as described in relation earlier embodiments). However, it is assumed that the beamforming processing apparatus does not maintain in the database information on a probability density function for each of one or more positions of one or more target receivers or at least not the most recent or up-to-date information. Instead, the probability density functions for said one or more positions need to be estimated before the beamforming may be performed.

The estimation of the probability density function of each of the one or more target receivers may be carried out either by one or more network nodes (so-called network-side positioning) or one or more target receivers (so-called device-side positioning). In network-side positioning, the network (i.e., one or more network nodes) performs measurements (e.g., relating to ranging and angle estimation), based on received samples of known uplink and/or downlink reference signals transmitted by the one or more target devices, in the case of terrestrial/non-terrestrial communication system, respectively, and estimates the target device position(s) based on said measurements. For example, Sounding Reference Signal (SRS) and/or Demodulation Reference Signal (DM-RS) may be used for the aforementioned measurements. Alternatively, Dedicated Positioning Reference Signal (PRS) may be used instead.

In device-side positioning, the target device estimates its own position. Specifically, the target device performs measurements (e.g., relating to ranging and angle estimation), based on received samples of known downlink and/or uplink reference signals transmitted by one or more network nodes in the case of a terrestrial/non-terrestrial communication system, respectively, and estimates its own position based on said measurements. For example, Synchronization Signal Block (SSB) and/or dedicated Positioning Reference Signal (PRS) may be used for the aforementioned measurements. The device-side positioning may be carried out using the Global Positioning System (GPS).

Furthermore, one or more of the following methods or algorithms may be used for the network-side positioning and/or the device-side positioning. Timing measurements may be performed based on a Time-Of-Arrival (TOA) algorithm or a Time-Difference-Of-Arrival (TDOA) algorithm. Said timing measurements may be complemented with Angle-of-Arrival (AOA) estimation. Kalman, Extended Kalman or particle filter may be used for tracking the estimated target device position over time, depending on whether linear or non-linear measurement models are used. Sensor data from the target device may be combined with any of the aforementioned measurement techniques to further improve the estimation.

The one or more network nodes and/or the one or more target receivers may be configured to transmit the results of the positioning (i.e., probability density functions) to the transmitter automatically when the positioning is carried out (which may occur periodically). Thus, the beamforming processing apparatus receives, in block 702, the information on the probability density function(s) from one or more network nodes and/or from one or more target devices connected wirelessly to the beamforming processing apparatus.

The actions relating to blocks 703, 704 may be carried out as described in relation to above embodiments, specifically as described for blocks 402, 403 of FIG. 4.

After the one or more optimal values of the one or more beam parameters defining the optimal beam for the at least one target receiver have been calculated in block 704, the beamforming processing apparatus causes transmitting, in block 705, at least one signal to the at least one target receiver via the antenna array using the optimal beam for transmission.

Depending on, for example, how the first and second optimization parameters are defined and how good the position estimate(s) for the target receiver(s) is, the optimal beam used for the transmission in block 705 may be generated using all of the plurality of the antenna elements of the antenna array or using only some of them. In response to the optimal beam being generated using only a part of the plurality of the antenna elements in block 706, the beamforming processing apparatus may cause transmitting, in block 707, at least one signal (or at least one secondary signal) to at least one secondary target receiver via the antenna array using a beam generated using unused antenna elements of the plurality of antenna elements. This enables the optimization of the spatial multiplexing gains available from the plurality of antenna elements of the antenna array. In the case of hybrid beamforming with a subarray structure, the transmission in block 705 may use a subset of subarrays of the overall antenna array and the remaining subarray(s) may be configured to create other beam(s) to serve other devices.

Figure 8:
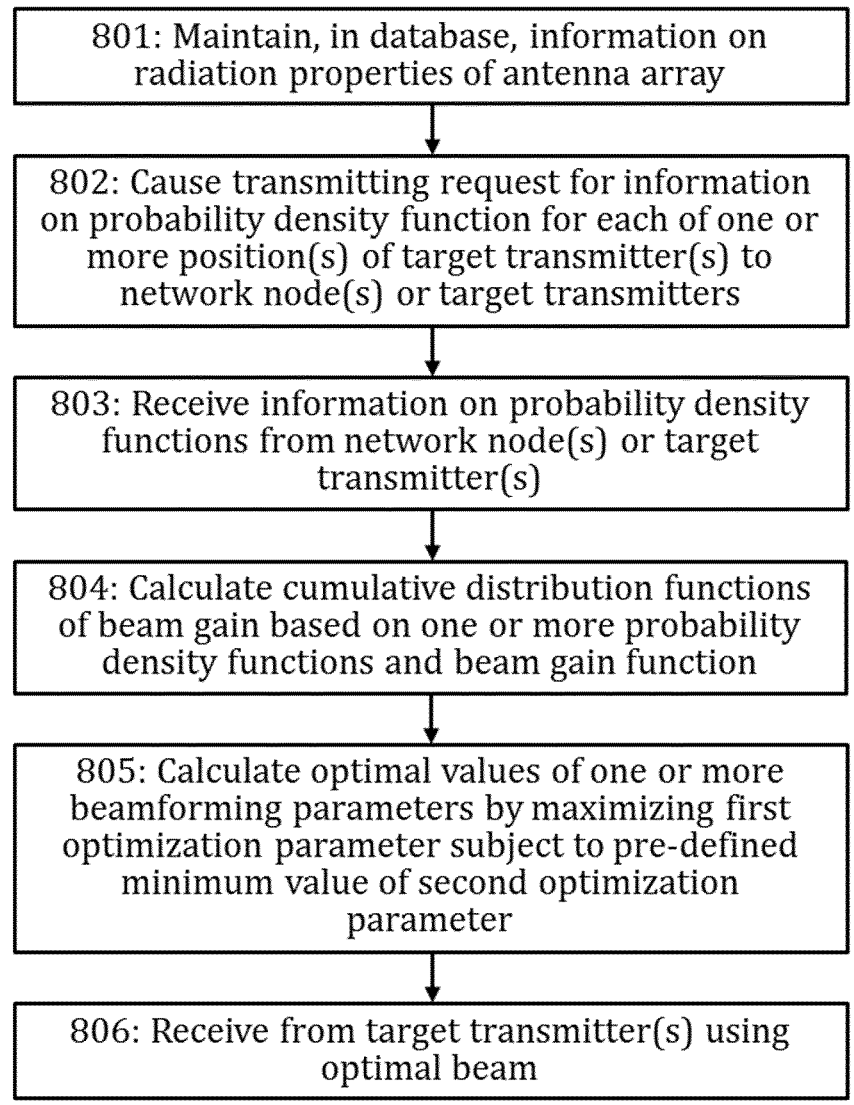

FIG. 8 illustrates another alternative process according to an embodiment for performing beamforming taking into account position uncertainty of the target devices. The illustrated process may be performed by a beamforming processing apparatus for a radio receiver or transceiver or specifically by the beamforming processing apparatus 202 of FIG. 2 (the apparatus 200 acting as a radio receiver) or the beamforming processing apparatus 302 of FIG. 3 (the apparatus 300 acting as a radio receiver). In some embodiments, the entity performing the process may be a radio receiver or transceiver 200, 300 as illustrated in FIG. 2 or 3, respectively, and/or element 104 (or a sub-element therein) of FIG. 1.

The process illustrated in FIG. 8 correspond for the most part to the process illustrated in FIG. 7. Specifically, blocks 801, 803, 804, 805 may correspond to blocks 701, 702, 703, 704 of FIG. 7. However, in this embodiment the baseband processing apparatus causes transmitting, in block 802, one or more requests for the information on a probability density function for each of one or more positions of one or more target transmitters to one or more network nodes and/or one or more target transmitters. The baseband processing apparatus may cause transmitting, for example, a single request to a single network node or a separate request for each of the one or more target transmitters. Upon receiving the request, each network node or target receiver may perform the positioning as described in relation to FIG. 7 or alternatively retrieve the information on the corresponding probability density function from a database if the estimation for the target device position has already been carried out and stored to in said database. Subsequently, each network node or target transmitter may cause transmitting the information on at least one probability density function to the radio receiver or transceiver comprising the beamforming processing apparatus). Consequently, the beamforming processing apparatus receives, in block 803, the information on a probability density function for each of one or more positions of one or more target transmitters from the one or more network nodes and/or the one or more target transmitters.

After the one or more optimal values of the one or more beam parameters defining the optimal beam for the at least one target transmitter have been calculated in block 805, the beamforming processing apparatus receives, in block 806, at least one signal from the at least one target transmitter via the antenna array using the optimal beam for reception.

It should be appreciated that the processes through which the information on a probability density function for each of one or more positions of one or more target devices are attained as described in relation to FIGS. 7 and 8 are not specific to a transmitter-type or receiver-type implementation of the beamforming processing apparatus. Similarly, the utilization of the unused antenna elements as described in relation to blocks 706, 707 for the transmitter implementation may be applied in a similar manner also for the receiver implementation. Specifically, in response to the optimal beam being generated using only a part of the plurality of the antenna elements, the beamforming processing apparatus may receive a signal from at least one secondary target transmitter via the antenna array using a beam generated using unused antenna elements of the plurality of antenna elements.

With a uniform linear array (ULA) antenna, it is possible to control the beamwidth by varying the number of antenna elements (i.e., array elements) used for the beamforming, as mentioned in relation to FIG. 4. The more antenna elements are used or are active, the narrower beam may be achieved. Hence, the beam parameter θ may, in the case of a ULA antenna, be described as a discrete number of used antenna elements. The number of the used antenna elements, in turn, controls the obtained beamwidth. For this reason, in order to emphasize the discrete nature of the performance optimization, the cumulative distribution function of beam gain for using $n=\{1, \ldots, N\}$ antenna elements may be denoted as $$F_n(\gamma) = \int_{-\infty}^{\gamma} p_{g_n}(\lambda) d\lambda = \int_{\Omega} p_x(x) dx_1 \ldots dx_D, \quad (10)$$

where $\Omega$ is defined as $\Omega = \{x \in \mathbb{R}^D | g_n(x) \leq \gamma\}$, $g_n(x)$ is the beam gain function for using n antenna elements and N is the total number of available antenna elements. Now, by defining the optimization criterion based on the service probability $\eta$, the optimal number of used antenna elements may be written as $$\hat{n} = \underset{n}{\mathrm{argmax}}\{F^{-1}(1 - \eta_{th}, n)\}, \quad (11)$$

In other words, the number of used antenna elements may act as one of the one or more beam parameters as defined in relation to block 403 of FIG. 4.

Figure 9:
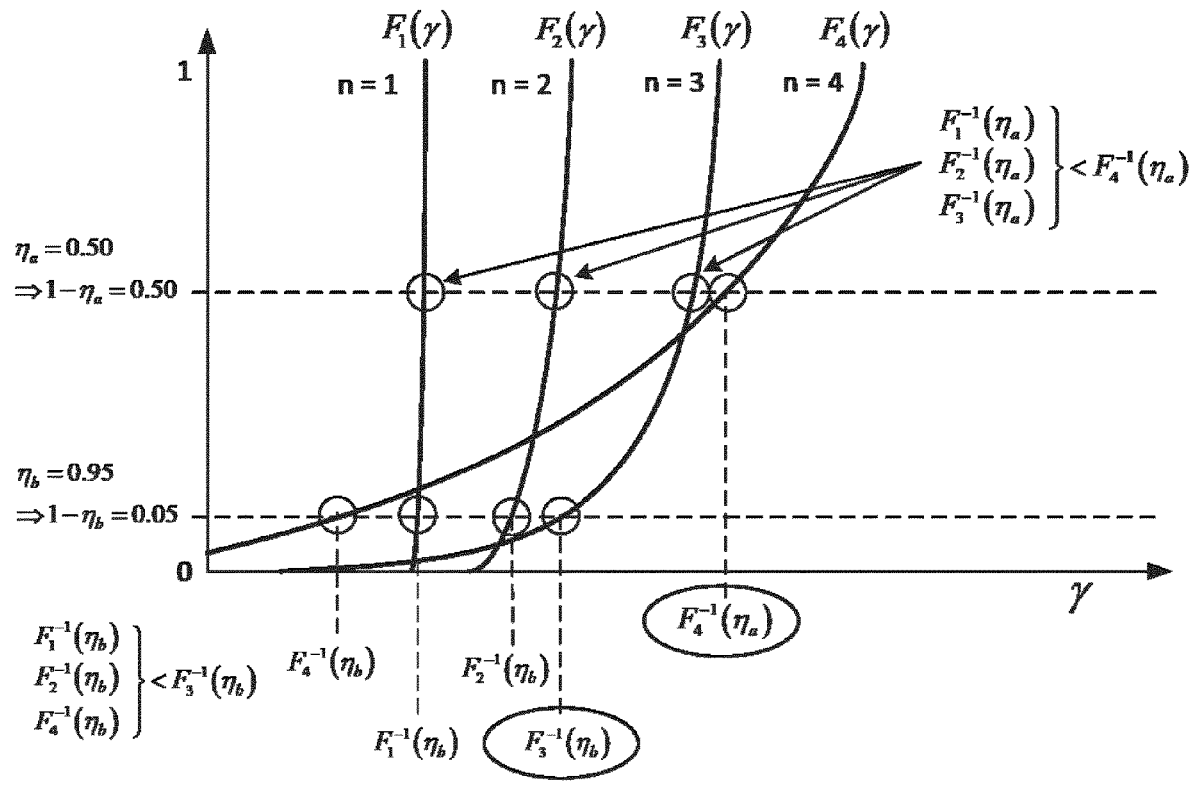
FIGS. 9 and 10 illustrate exemplary beamforming optimization results using exemplary processes according to embodiments.

In FIG. 9, the optimization of the number of used antenna elements n according to equation (11) is illustrated by considering four separate values of n with 2 different service probability criteria ($\eta_{th}=0.50$ (=50%) and $\eta_{th}=0.95$ (=95%)). In this example, when the service probability is equal to 0.50, beam gain is increased at each step when moving from n=1 to n=4 with the highest beam gain being, thus, provided with n=4. In other words, the relatively low service probability requirement of 0.50 is reached even when a narrow beam corresponding to n=4 is used. However, when the service probability requirement is tightened by increasing the minimum service probability to 0.95, the highest number of used antenna elements does not correspond to the optimal performance. In fact, using four antenna elements (n=4), that is, using the narrowest beam, results in lowest beam gain out of the four studied cases. The optimal performance is provided in this case with three antenna elements (n=3) which serves as the best compromise between providing high gain and high service probability. As depicted with these two examples ($\eta=0.50$ and $\eta=0.95$), optimal value for the number of used antenna elements depends on the desired service probability.

Similarly, if the optimization criterion is defined based on the minimum desired beam gain $\gamma_{th}$ similar to equation (6), the optimal number of used antenna elements $\hat{n}$ may be written as $$\hat{n} = \underset{n}{\mathrm{argmax}}\{1 - F_n(\gamma_{th}, n)\}. \quad (12)$$

Figure 10:
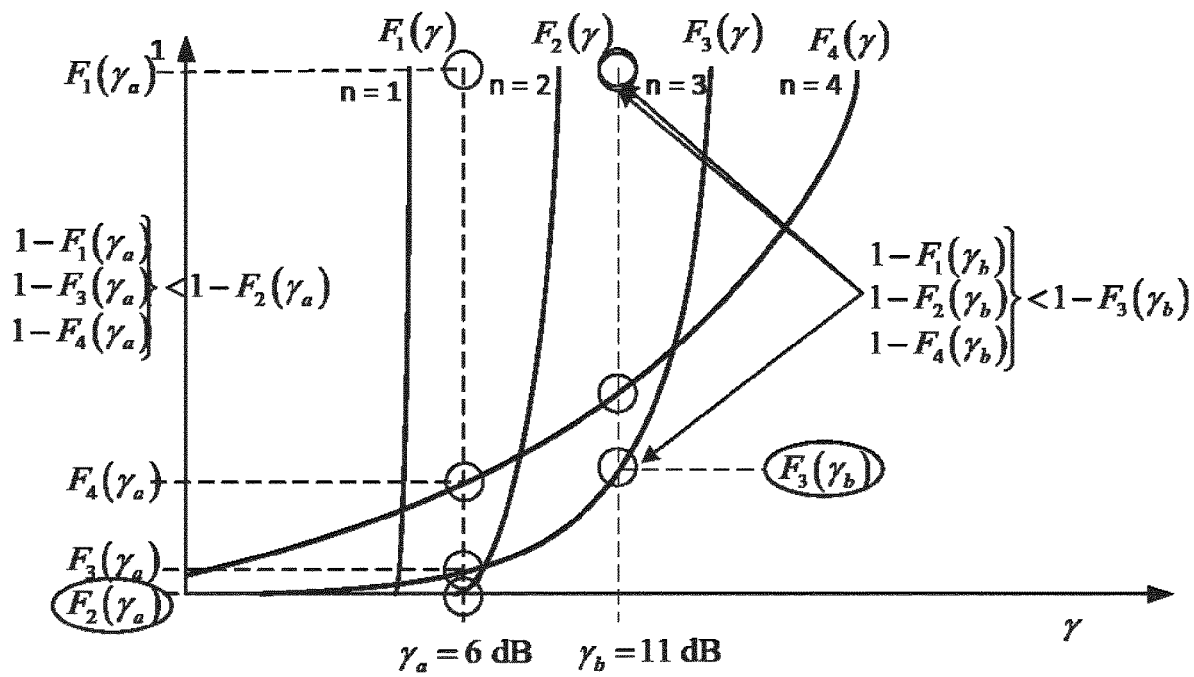

FIG. 10 illustrates the optimization of the number of used antenna elements n according to equation (12) by considering the four separate values of n discussed above with two different beam gain criteria ($\gamma_{th}$=6 dB and $\gamma_{th}$=11 dB). With the lower minimum beam gain criterion $\gamma_{th}$=6 dB, the highest service probability (i.e., lowest value for the cumulative distribution function) is provided by using two antenna elements (n=2). In this instance, the service probability is very close to one. On the other hand, if the higher minimum beam gain criterion $\gamma_{th}$=11 dB is used, the highest service probability is provided by using three antenna elements (n=3) though even with three antenna elements the service probability is not very high in this case.

The equations describing the optimization of the number of antenna elements by maximizing beam gain or service probability subject to the minimum desired value of service probability and the beam gain, respectively, (i.e., equations (11) and (12)) may be also easily generalized for two-dimensional antenna arrays. For a two-dimensional rectangular antenna array with regular spacing between antenna elements in two orthogonal directions (defined here as x- and y-directions) along the array, the number of the antenna elements may be written as a vector n=($n_x$, $n_y$), where $n_x$ and $n_y$ are, respectively, the number of used antenna elements along x- and y-directions having values $n_x$=1, . . . $N_x$ and $n_y$=1, . . . $N_y$, $N_x$ and $N_y$ being the total number of available antenna elements in x- and y-directions. Using this definition, the equations (11) and (12) may be written, respectively in generalized forms $$\hat{n} = \underset{n}{\operatorname{argmax}}\{F^{-1}(1 - \eta_{th}, n)\} \text{ and} \quad (11)$$

$$\hat{n} = \underset{n}{\operatorname{argmax}}\{1 - F_n(\gamma_{th}, n)\}. \quad (12)$$

The vector n may be comprised in the one or more beam parameters θ.

Corresponding equations describing the optimization of the number of antenna elements by maximizing beam gain or service probability subject to the minimum desired value of service probability and the beam gain may also be written for the multi-user scenario:

$$\hat{n} = \underset{n}{\operatorname{argmax}}\{\Psi(F_{tg,1}^{-1}(1 - \eta_{th,1}, n), \ldots, F_{tg,K}^{-1}(1 - \eta_{th,K}, n))\} \text{ and} \quad (13)$$

$$\hat{n} = \underset{n}{\operatorname{argmax}}\{\Psi(1 - F_{tg,1}(\gamma_{th,1}, n), \ldots, 1 - F_{tg,K}(\gamma_{th,K}, n))\}. \quad (14)$$

Figure 11A:
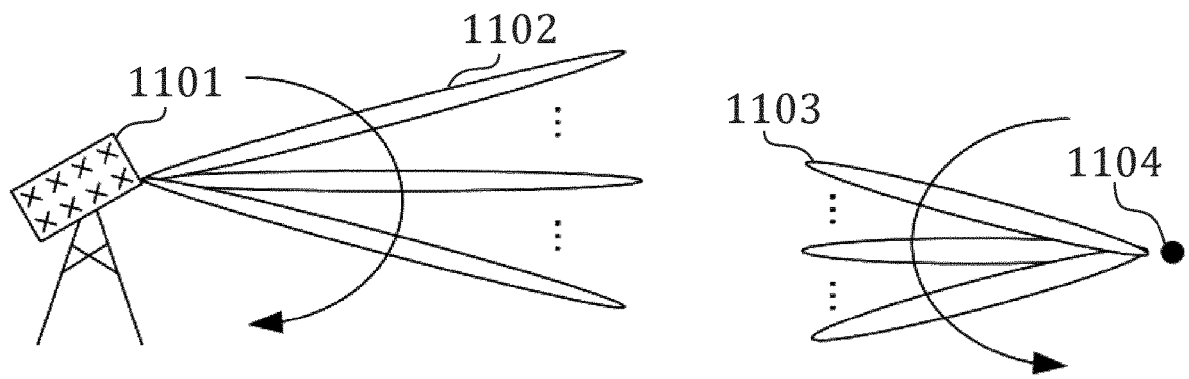
FIGS. 11A and 11B illustrate exemplary processes according to embodiments.
Figure 11B:
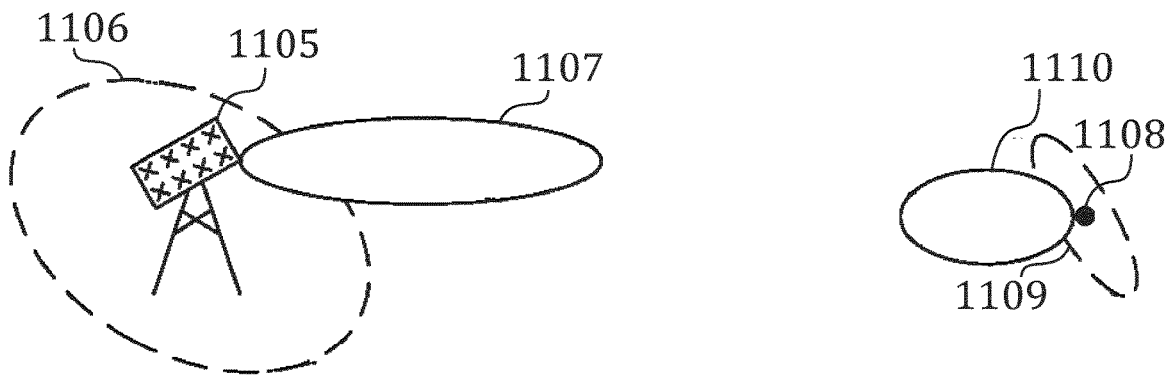

The beamforming optimization based on target device position uncertainty according to any of the above embodiments may also be employed for reducing training information overhead and latency in transmitter and/or receiver beam alignment procedures (i.e., beam sweeping procedures). This improvement is illustrated in FIGS. 11A and 11B. FIG. 11A illustrates a conventional beam sweeping based alignment process and FIG. 11B illustrates beam gain optimization for transmitter and/or receiver beams based on the location uncertainty of transmitter and/or receiver positions.

Specifically, in FIG. 11A an exhaustive search of the best transmitter-receiver beam pair(s) based on beam sweeping is performed across the full sets of transmitter and receiver candidate beams 1102, 1103. The devices 1101, 1104 may correspond, respectively, to a transmitter and a receiver or a receiver and a transmitter. Obviously, such a procedure may be very time and resource intensive if the number of transmitter-receiver beam pairs is large.

In FIG. 11B, the outcome of the beamforming optimization procedure according to the embodiments, that is, the optimal beam parameter(s) corresponding to the optimal beam 1107 of the transmitter/receiver 1105 for the target receiver/transmitter 1108, is used, by the beamforming processing apparatus, to instantaneously determine and optimize the transmitter/receiver beam 1107 for the initial transmission/reception, respectively. The ellipse 1109 illustrates the uncertainty area of the estimated position for the target transmitter/receiver 1108. The beam 1107 may be optimized according to the invention based on the uncertainty area 1109. In a similar manner, the beam 1110 may be optimized based on the estimated uncertainty area 1106 of the target receiver/transmitter 1105. If required, the beamforming processing apparatus may also be configured to split the beam 1107 (or the beam 1110) into a number of narrower beams for further beam refinement. This refinement phase may employ conventional training-based beam search. As the optimal beam 1107 covers the angle space where the target receiver/transmitter 1108 is with high probability, the more accurate beam refinement process should be contained to the same angle space with narrower beams. The aforementioned functionalities enable the reduction of the amount of resources allocated for the transmitter/receiver candidate beams and to reduce the latency associated to the beam alignment process.

The estimated position information aided beamforming according to any embodiments described above may be used for tracking and re-discovery of the transmitter-receiver beam pairs. Transmitter and receiver beam tracking are required to address the mobility of the transmitter and/or receiver. Similarly in case of beam failure, the transmitter and receiver beam pairs need to be rediscovered. The beamforming optimization methodology according to the invention is used to reduce the overhead and latency associated to the beam tracking and re-discovery phases by re-optimizing transmitter/receiver beam leveraging on the updated position estimates.

The estimated position information aided beamforming according to any embodiments described above may be also used for neighbor cell measurements. Assuming that measuring UE has uncertainty of either of its own or network node position and information on the related likelihood, UE may optimize its receiver beamformer.

The blocks, related functions, and information exchanges described above by means of FIGS. 4, 5B, 6A, 6B, 7, 8, 9, 10 and 11B in no absolute chronological order, and some of them may be performed simultaneously or in an order differing from the given one. Other functions can also be executed between them or within them, and other information may be sent, and/or other rules applied. Some of the blocks or part of the blocks or one or more pieces of information can also be left out or replaced by a corresponding block or part of the block or one or more pieces of information.

Figure 12:
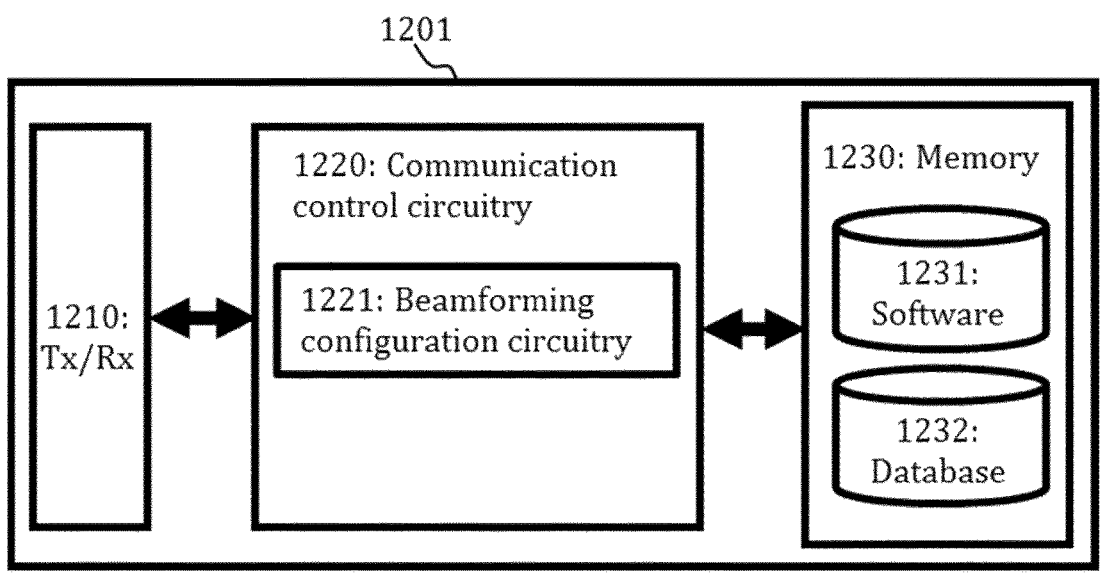
FIG. 12 illustrates an apparatus according to embodiments.

FIG. 12 provides a beamforming processing apparatus of a transmitter, a receiver or a transceiver according to some embodiments. FIG. 12 illustrates a beamforming processing apparatus configured to carry out at least the functions described above in connection with configuring beamforming for providing communication to one or more target devices (i.e., to one or more target transmitters or to one or more target receivers). Each beamforming processing apparatus may comprise one or more communication control circuitry 1220, such as at least one processor, and at least one memory 1230, including one or more algorithms 1231, such as a computer program code (software) wherein the at least one memory and the computer program code (software) are configured, with the at least one processor, to cause the beamforming processing apparatus to carry out any one of the exemplified functionalities of the beamforming processing apparatus described above. The memory 1230 may comprise a database 1232 which may be the database as discussed in relation to any of the above embodiments. Alternatively, the database 1232 may be another database and the database discussed in relation to above embodiments is an external database accessible via the interfaces 1210.

Referring to FIG. 12, the communication control circuitry 1220 of the beamforming processing apparatus 1201 comprise at least beamforming configuration circuitry 1221 which is configured to configure a transmitter, a receiver or a transceiver in which the beamforming processing apparatus is comprised for providing communication to a target device. To this end, the beamforming configuration circuitry 1221 is configured to carry out functionalities described above by means of any of FIGS. 4, 5B, 6A, 6B, 7, 8, 9, 10 and 11B using one or more individual circuitries.

Referring to FIG. 12, the memory 1230 may be implemented using any suitable data storage technology, such as semiconductor based memory devices, flash memory, magnetic memory devices and systems, optical memory devices and systems, fixed memory and removable memory.

Referring to FIG. 12, the access node may further comprise different interfaces 1210 such as one or more communication interfaces (TX/RX) comprising hardware and/or software for realizing communication connectivity over the medium according to one or more communication protocols. Specifically, the one or more communication interfaces may provide a connection to other elements of the transmitter, receiver or transceiver so as to enable, for example, reception of signals from analog front-ends to implement one or more reception beams determined by the beamforming processing apparatus, providing received, beamforming-processed signals to further (baseband) processing, reception of signals to be transmitted and/or providing beamforming-processed signals to be transmitted to one or more antennas (via one or more analog front-ends and one or more RF front-ends) for transmission using one or more transmission beams determined by the beamforming processing apparatus. The communication interface may, thus, provide a transmitter, a receiver or a transceiver of the beamforming processing apparatus with communication capabilities to communicate in the cellular communication system and enable communication between user devices (terminal devices) and different network nodes or elements and/or a communication interface to enable communication between different network nodes or elements, for example.

FIG. 12 may alternatively illustrate a transmitter, a receiver or a transceiver comprising a beamforming processing apparatus according to some embodiments. In such embodiments, the communication control circuitry 1220 may comprise circuitry configured to perform functions of a baseband processor and/or a plurality of analog front-ends (e.g., as illustrated in FIG. 2 and/or FIG. 3). The one or more communication interfaces 1210 may comprise standard well-known components such as an amplifier, filter, frequency-converter, (de)modulator, and encoder/decoder circuitries, controlled by the corresponding controlling units, and one or more antennas. For example, the one or more communication interfaces 1210 may comprise any of the plurality of RF front-ends and/or a plurality of antenna elements illustrated in FIG. 2 and/or FIG. 3. The communication interfaces may comprise optical interface components providing the base station with optical fiber communication capability.

As used in this application, the term 'circuitry' may refer to one or more or all of the following: (a) hardware-only circuit implementations, such as implementations in only analog and/or digital circuitry, and (b) combinations of hardware circuits and software (and/or firmware), such as (as applicable): (i) a combination of analog and/or digital hardware circuit(s) with software/firmware and (ii) any portions of hardware processor(s) with software, including digital signal processor(s), software, and memory(ies) that work together to cause an apparatus, such as a terminal device or an access node, to perform various functions, and (c) hardware circuit(s) and processor(s), such as a microprocessor(s) or a portion of a microprocessor(s), that requires software (e.g. firmware) for operation, but the software may not be present when it is not needed for operation. This definition of 'circuitry' applies to all uses of this term in this application, including any claims. As a further example, as used in this application, the term 'circuitry' also covers an implementation of merely a hardware circuit or processor (or multiple processors) or a portion of a hardware circuit or processor and its (or their) accompanying software and/or firmware. The term 'circuitry' also covers, for example and if applicable to the particular claim element, a baseband integrated circuit for an access node or a terminal device or other computing or network device.

In embodiments, the at least one processor, the memory, and the computer program code form processing means or comprises one or more computer program code portions for carrying out one or more operations according to any one of the embodiments illustrated in FIGS. 4, 5B, 6A, 6B, 7, 8, 9, 10 and 11B or operations thereof.

Embodiments as described may also be carried out in the form of a computer process defined by a computer program or portions thereof. Embodiments of the methods described in connection with FIGS. 4, 5B, 6A, 6B, 7, 8, 9, 10 and 11B may be carried out by executing at least one portion of a computer program comprising corresponding instructions. The computer program may be provided as a computer readable medium comprising program instructions stored thereon or as a non-transitory computer readable medium comprising program instructions stored thereon. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to examples according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A beamforming processing apparatus for a radio transmitter or receiver comprising an antenna array, the beamforming processing apparatus comprising:
   at least one processor; and
   at least one non-transitory memory including computer program code;
   the at least one memory and the computer program code configured, with the at least one processor, to cause the beamforming processing apparatus at least to perform:
   maintaining, in a database, information on radiation properties of the antenna array and information on a probability density function for each of one or more positions of one or more target devices, wherein the radiation properties of the antenna array comprise sets of values of one or more beam parameters defining a shape of each beam producible with the antenna array and a two-dimensional or three-dimensional beam gain function defined to depend on the one or more beam parameters;
   calculating, for each set of values of the one or more beam parameters, one or more cumulative distribution functions of a beam gain based on the one or more probability density functions and the beam gain function; and
   calculating one or more optimal values of the one or more beam parameters defining an optimal beam by maximizing a first optimization parameter defined based on the one or more cumulative distribution functions subject to a pre-defined minimum value of a second optimization parameter.

2. The beamforming processing apparatus of claim 1, wherein the first optimization parameter relates to a service probability of at least one target device and the second optimization parameter to a beam gain of said at least one target device or the first optimization parameter relates to a beam gain of at least one target device and the second optimization parameter to a service probability of said at least one target device.

3. The beamforming processing apparatus of claim 1, wherein the service probability is defined as a probability for achieving at least a pre-defined value for a beam gain for a target device.

4. The beamforming processing apparatus according to claim 1, wherein each of one or more target devices is a target receiver if the beamforming processing apparatus is for the radio transmitter or a target transmitter if the beamforming processing apparatus is for the radio receiver.

5. The beamforming processing apparatus according claim 1, wherein the at least one memory and the computer program code are configured, with the at least one processor, to cause the beamforming processing apparatus, if the beamforming processing apparatus is for the radio transmitter, to perform:
   causing transmitting at least one signal to at least one target receiver via the antenna array using the optimal beam in transmission.

6. The beamforming processing apparatus according to claim 1, wherein the at least one memory and the computer program code are configured, with the at least one processor, to cause the beamforming processing apparatus, if the beamforming processing apparatus is for the radio transmitter, to perform:
   in response to the optimal beam being generated using only a part of plurality of the antenna elements of the antenna array, causing transmitting a signal to at least one secondary target receiver via the antenna array using a beam generated using unused antenna elements of the plurality of antenna elements.

7. The beamforming processing apparatus according to claim 1, wherein the at least one memory and the computer program code are configured, with the at least one processor, to cause the beamforming processing apparatus, if the beamforming processing apparatus is for the radio receiver, to perform:
   receiving at least one signal from at least one target transmitter via the antenna array using the optimal beam in reception.

8. The beamforming processing apparatus according to claim 1, wherein the at least one memory and the computer program code are configured, with the at least one processor, to cause the beamforming processing apparatus, if the beamforming processing apparatus is for the radio receiver, to perform:
   in response to the optimal beam being generated using only a part of plurality of the antenna elements of the antenna array, receiving a signal from at least one secondary target transmitter via the antenna array using a beam generated using unused antenna elements of the plurality of antenna elements.

9. The beamforming processing apparatus according to claim 1, wherein the at least one memory and the computer program code are configured, with the at least one processor, to cause the beamforming processing apparatus to perform the calculating of each cumulative distribution function of the beam gain for a position of a target device according to $$F(\gamma,\theta)=\int_\Omega p_x(x)dx_1 \ldots dx_D,$$

wherein $F(\gamma,\theta)$ is a cumulative distribution function depending on the beam gain $\gamma$ and on a vector representing a set of values of the one or more beam parameters $\theta$, $p_x(x)$ is a probability density function for the position x of the target device, $\Omega$ is defined as $\Omega=\{x\in\mathbb{R}^D|g(x,\theta)\leq\gamma\}$ and D is the number of dimensions of the beam gain function, $g(x,\theta)$ being the beam gain function.

10. The beamforming processing apparatus according to claim 1, wherein the first optimization parameter and the second optimization parameter are defined according to one of the following:
    the first optimization parameter is a service probability for a target device of the one or more target devices and the second optimization parameter is a beam gain for the target device,
    the first optimization parameter is the beam gain for the target device and the second optimization parameter is the service probability for the target device,
    the first optimization parameter is a combined service probability for one or more target devices and the second optimization parameter is the beam gain for the one or more target devices, and
    the first optimization parameter is a combined beam gain for one or more target devices and the second optimization parameter is the service probability for the one or more target devices.

11. The beamforming processing apparatus according to claim 10, wherein the at least one memory and the computer program code are configured, with the at least one processor, to cause the beamforming processing apparatus to perform the calculating of the one or more optimal values of the one or more beam parameters defining the optimal beam by:
calculating, if the first optimization parameter is defined to be the beam gain for the target device and the second optimization parameter is defined to be the service probability for the target device, the one or more optimal values $\hat{\theta}$ using $$\hat{\theta} = \underset{\theta}{\mathrm{argmax}}\{F^{-1}(1-\eta_{th},\theta)\},$$

wherein $F^{-1}(1-\eta_{th},\theta)$ is an inverse function of a cumulative distribution function corresponding to the beam gain to be maximized $\gamma_{max}$, $\eta_{th}$ is the pre-defined minimum value of the service probability and $\theta$ corresponds to values of the one or more beam parameters; and/or
calculating, if the first optimization parameter is defined to be the service probability for the target device and the second optimization parameter is defined to be the beam gain for the target device, the one or more optimal values $\hat{\theta}$ using $$\hat{\theta} = \underset{\theta}{\mathrm{argmax}}\{1 - F(\gamma_{th},\theta)\},$$

wherein $F(\gamma_{th}, \theta)$ is a cumulative distribution function, $1-F(\gamma_{th}, \theta)$ corresponds to the service probability to be maximized $\eta_{max}$, $\gamma_{th}$ is the pre-defined minimum value of the beam gain and $\theta$ corresponds to values of the one or more beam parameters.

12. The beamforming processing apparatus according to claim 10, wherein the at least one memory and the computer program code are configured, with the at least one processor, to cause the beamforming processing apparatus to perform the calculating of the one or more optimal values of the one or more beam parameters defining the optimal beam by:
calculating, if the first optimization parameter is defined to be the combined beam gain for the target device and the second optimization parameter is defined to be the service probability for the target device, the one or more optimal values $\hat{\theta}$ using $$\hat{\theta} = \underset{\theta}{\mathrm{argmax}}\{\Psi(F_{tg,1}^{-1}(1-\eta_{th,1},\theta), \ldots, F_{tg,K}^{-1}(1-\eta_{th,K},\theta))\},$$

wherein K is the number of the one or more target devices, $F_{tg,n}^{-1}(1-\eta_{th,n},\theta)$ is an inverse function of a cumulative distribution function corresponding to the beam gain to be maximized $\gamma_{max}$ for the nth target device, $\eta_{th,n}$ is the pre-defined minimum value of the service probability for the nth target device, $\theta$ corresponds to values of the one or more beam parameters and $\Psi$ is a supplementary objective function defined as a linear combination of its arguments, n being a positive integer having values n=1, . . . ,K; and/or
calculating, if the first optimization parameter is defined to be the combined service probability for one or more target devices and the second optimization parameter is defined to be the beam gain for the one or more target devices, the one or more optimal values $\hat{\theta}$ using $$\hat{\theta} = \underset{\theta}{\mathrm{argmax}}\{\Psi(1 - F_{tg,1}(\gamma_{th,1},\theta), \ldots, 1 - F_{tg,K}(\gamma_{th,K},\theta))\},$$

wherein K is the number of the one or more target devices, $F_{tg,n}(1-\eta_{th,n},\theta)$ is a cumulative distribution function for an nth target device, $1-F(\gamma_{th,n}, \theta)$ corresponds to the service probability to be maximized $\eta_{max,n}$ for the nth target device, $\gamma_{th,n}$ is the pre-defined minimum value of the beam gain for the nth target device, $\theta$ corresponds to values of the one or more beam parameters and $\Psi$ is a supplementary objective function defined as a linear combination of its arguments, n being a positive integer having values n=1, . . . ,K.

13. The beamforming processing apparatus according to claim 12, wherein $\eta_{th,n}=\eta_{th}$ for all n=1, . . . ,K and/or $\gamma_{th,n}=\gamma_{th}$ for all n=1, . . . ,K.

14. The beamforming processing apparatus according to claim 12, wherein the at least one memory and the computer program code are configured, with the at least one processor, to cause the beamforming processing apparatus, if the first optimization parameter is defined to be the combined beam gain for the target device and the second optimization parameter is defined to be the service probability for the target device or if the first optimization parameter is defined to be the combined service probability for one or more target devices and the second optimization parameter is defined to be the beam gain for the one or more target devices, to perform:
maintaining, in the database, information on one or more weighting factors for the one or more target devices; and
applying, in the linear combination of the supplementary objective function, each of the one or more weighting factors to an argument of the supplementary objective function associated with a corresponding target device.

15. The beamforming processing apparatus according to claim 1, wherein the one or more beam parameters comprise one or more of an azimuthal beamwidth, an elevational beamwidth, a number of antenna elements along a first direction of the antenna array, a number of antenna elements along a second direction of the antenna array orthogonal to the first direction, a vector comprising values for one or more beamforming weights and an index pointing to a specific entry in a codebook.

16. The beamforming processing apparatus according to claim 1, wherein the at least one memory and the computer program code are configured, with the at least one processor, to cause the beamforming processing apparatus to attain the information on the probability density functions for each of the one or more positions of the one or more target devices by performing:
receiving the information on the probability density functions from a network node or from one or more target devices connected wirelessly to the beamforming processing apparatus; or
causing sending a request for the information on the probability density functions to a network node or one or more target devices connected wirelessly to the beamforming processing apparatus and receiving the information on the probability density functions correspondingly from the network node or the one or more target devices.

17. A method comprising:
maintaining, in a database, information on radiation properties of an antenna array and information on a probability density function for each of one or more positions of one or more target devices, wherein the radiation properties of the antenna array comprise sets of values of one or more beam parameters defining a shape of each beam producible with the antenna array and a two-dimensional or three-dimensional beam gain function defined to depend on the one or more beam parameters;

calculating, with a beamforming processing apparatus, for each set of values of the one or more beam parameters, one or more cumulative distribution functions of a beam gain based on the one or more probability density functions and the beam gain function; and calculating, with the beamforming processing apparatus, one or more optimal values of the one or more beam parameters defining an optimal beam by maximizing a first optimization parameter defined based on the one or more cumulative distribution functions subject to a pre-defined minimum value of a second optimization parameter.

18. A non-transitory computer readable media having stored thereon instructions that, when executed with a computing device, cause the computing device to perform:

calculating, for each set of values of one or more beam parameters, one or more cumulative distribution functions of a beam gain based on one or more probability density functions for each of one or more positions of one or more target devices and on a two-dimensional or three-dimensional beam gain function defined to depend on the one or more beam parameters, wherein each set of values of the one or more beam parameters defines a shape of a beam producible with the antenna array; and calculating, with the beamforming processing apparatus, one or more optimal values of the one or more beam parameters defining an optimal beam with maximizing a first optimization parameter defined based on the one or more cumulative distribution functions subject to a pre-defined minimum value of a second optimization parameter.

* * * * *